ELECTRONIC DRIVE CIRCUITS FOR REMOTE CONTROL SYSTEMS

Filed Dec. 20, 1961 3 Sheets-Sheet 1

Office.

INVENTORS
Stanley Leonard Hurst and
Michael Paskins.
BY W. L. Stout
THEIR ATTORNEY INVENTORS
Stanley Leonard Hurst and
Michael Paskins
BY
W. L. Stout
THEIR ATTORNEY June 23, 1964 S. L. HURST ETAL 3,138,781

ELECTRONIC DRIVE CIRCUITS FOR REMOTE CONTROL SYSTEMS

Filed Dec. 20, 1961 3 Sheets-Sheet 3

INVENTORS
Stanley Leonard Hurst
and Michael Raskins
BY W. L. Stout
THEIR ATTORNEY United States Patent Office 3,138,781
Patented June 23, 1964

3,138,781
ELECTRONIC DRIVE CIRCUITS FOR REMOTE CONTROL SYSTEMS

Stanley Leonard Hurst, Westbury-on-Trym, Bristol, and Michael Paskins, London, England, assignors to Westinghouse Brake and Signal Company, Limited, London, England Filed Dec. 20, 1961, Ser. No. 160,743
Claims priority, application Great Britain Dec. 21, 1960
11 Claims. (Cl. 340—163)

Our invention relates to electronic drive circuits for remote control systems. More particularly, our invention relates to electronic drive circuits, commonly termed flywheel drive circuits, for maintaining the stepping of the counting chain at remote station locations in an electronic remote control system, in which all remote station locations are scanned during each cycle of operation to effect the transmission and reception of control and indication functions at the office and field locations.

In a particular form of this type of electronic remote control system, the scanning of the control devices at the control office takes place in a continuous sequential cycle which advances in synchronism with the similar scanning of the corresponding apparatus at the remote station or stations. On each step of the scanning action, the desired condition of a particular control device is transmitted to the corresponding stage at the then active station. In a corresponding manner, the condition of the particular indication device assigned to that counting stage at the station being scanned is likewise transmitted to the office location. It is apparent that the correct operation of a system of this type is fundamentally dependent upon the scanning of the counting chain stages at the office and stations being in step so that information transmitted on any particular step of the cycle correctly reaches the corresponding stage at the receiving location. Normally, stepping pulses are transmitted from the control office to drive the counting chains located at the station or stations of the system. It will be appreciated, however, that momentary loss or mutilation of a stepping pulse, for example as caused by interference on the communication channel, may result in a loss of synchronism between the control office chain and the various field counting chains until such time as synchronism is restored, actuated by means of a unique synchronizing signal usually transmitted at the end of the stepping cycle. For this reason, information transmitted during the same cycle after the loss of synchronism will be incorrectly registered at the field location. Obviously, it will be of particular advantage if the stepping action of the field counting chain may be continued in relative synchronism with that of the office chain during periods in which the transmission of the stepping pulses from the office is interrupted or the pulses multilated in transmission.

Accordingly, an object of our invention is the provision of means at a station of a cyclic scanning remote control system which compensates for short interruptions in the sequential stepping pulses received from the master control location.

Another object of our invention is apparatus for continuing the consecutive stepping operation of the station counting chains of such a remote control system if the normal reception of the master stepping pulses transmitted from the control location is momentarily interrupted.

A further object of our invention is an auxiliary stepping generator means for remote station locations, of a cyclic scanning remote control system, which provides pulses to continue the stepping action of the station counting chain in synchronism wtih the stepping action of the office counting chain during periods of interruption or faults in the transmission of master stepping pulses to the station.

Still another object of our invention is means in such type remote control systems for maintaining the synchronism in the stepping action between the office and station locations for a period of time in the event of interruption or mutilation of the regular master stepping pulses generated and transmitted from the control office.

It is also an object of our invention to provide auxiliary stepping generator apparatus at each station location in a remote control system of the cyclic scan type which will drive the local stepping or counting chain, this auxiliary apparatus being normally driven by master stepping pulses received from the control office, but becoming self driving to maintain the stepping action of the station chain during momentary absence or mutilation of the master pulses.

Still another object of our invention is an electronic flywheel circuit at a remotely controlled station in a control system, which circuit is normally kept in regular and synchronous oscillation by the reception of master stepping pulses from the control office, but which continues its oscillation to drive the local counting chain for a sufficient period of time to bridge periods of absence or mutilation of the master stepping pulses.

Other objects, features, and advantages of our invention will become apparent from the following description when taken in connection with the accompanying drawings.

We shall now describe generally and then in detail the system of our invention with particular reference to the various figures of the drawings in which.

Figure 1:
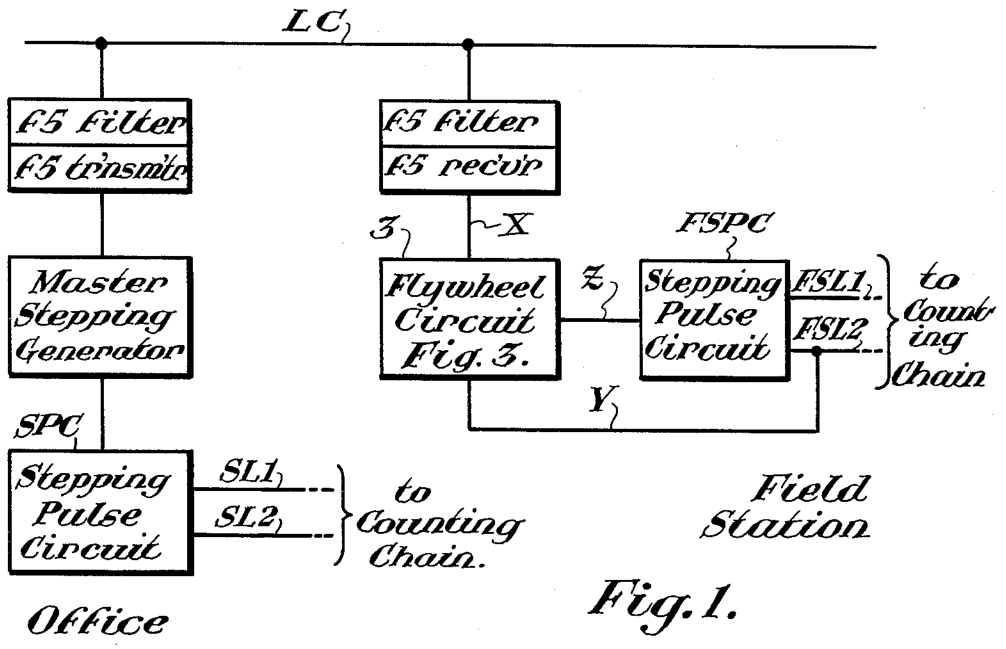
FIG. 1 is a conventional block diagram of a single station remote control system arranged to illustrate the use of a first form of apparatus embodying our invention.
Figure 3:
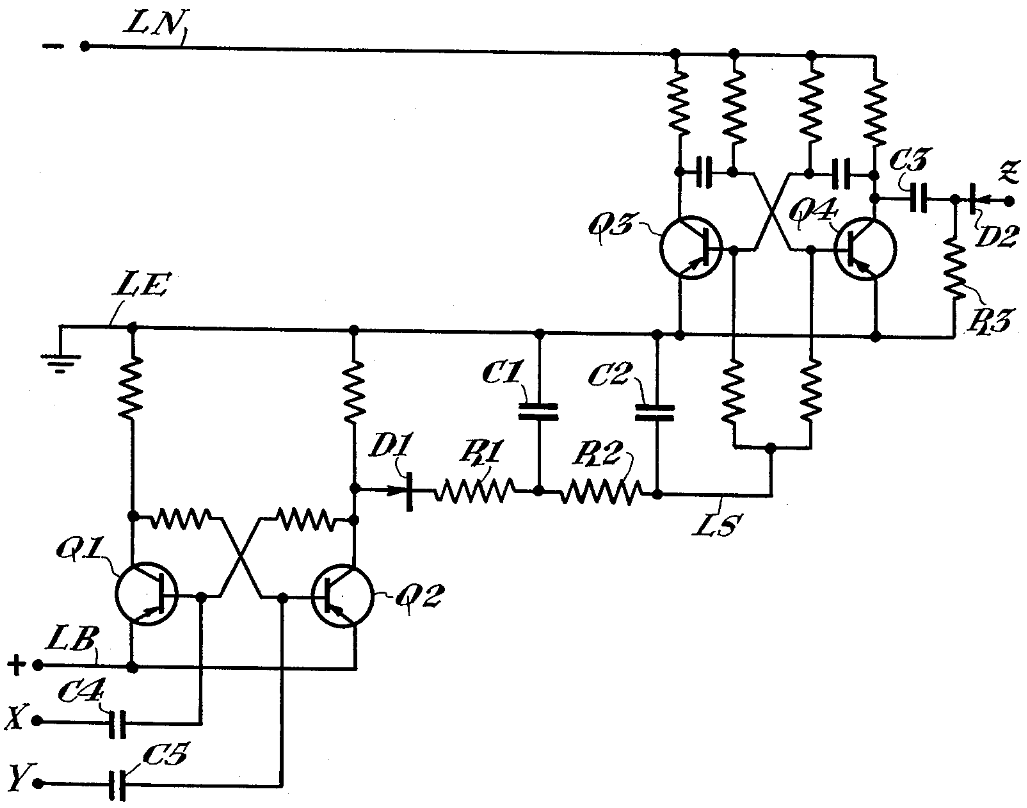

FIG. 3 of the drawings is a diagrammatic illustration of a detailed electronic circuit embodying the first form of the flywheel generator driving circuits of our invention, for use in the system arrangement as illustrated in FIG. 1.

Figure 2:
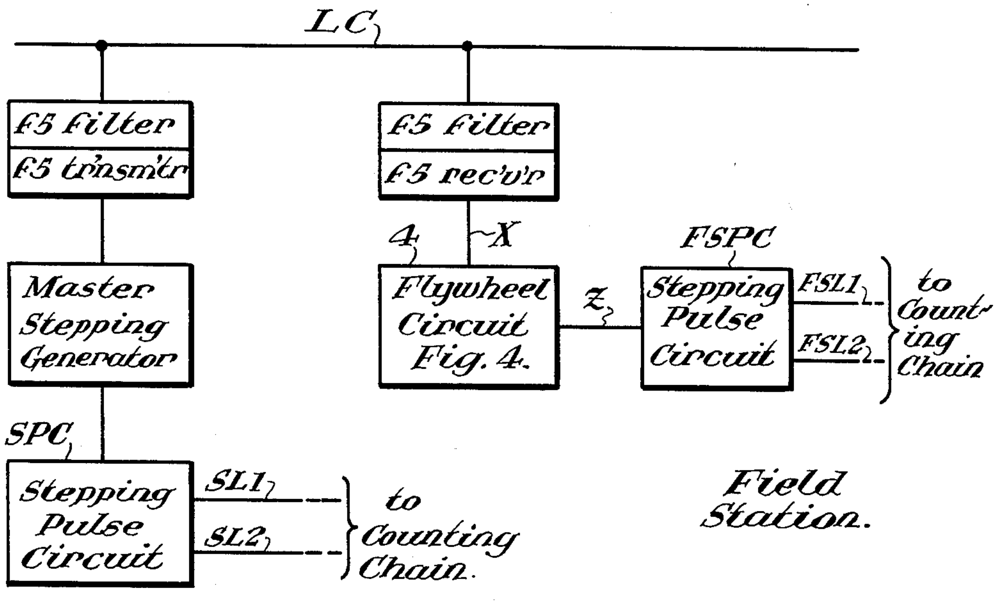
FIG. 2 is also a conventional block diagram of a similar single station remote control system arranged to use apparatus embodying a second form of our invention.
Figure 4:
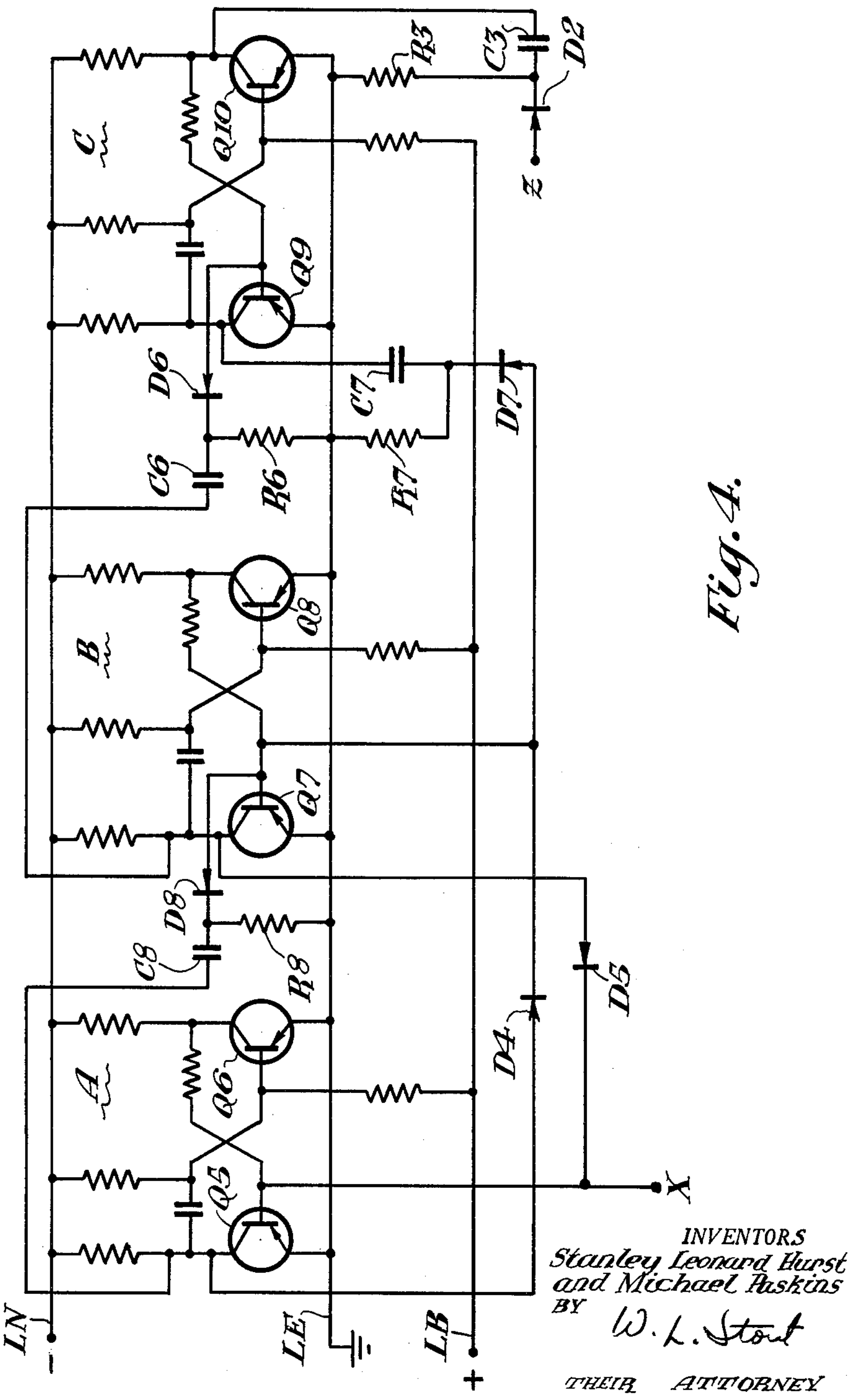

In FIG. 4 is another diagrammatic circuit illustration, showing the detailed circuits embodying the second form of a flywheel pulse generator embodying the principles of our invention, this circuit arrangement being intended for use with the system layout shown in FIG. 2.

In each of the figures of the drawings, similar parts of the apparatus are designated by similar reference characters.

The circuit arrangements shown in FIGS. 3 and 4 of the drawings are designed for specific application to an electronic, transistorized, continuously scanning remote control system of the type disclosed in the copending application for Letters Patent of the United States Serial No. 710,718, filed January 23, 1958, by B. H. Grose and S. L. Hurst for Remote Control Systems, now Patent No. 3,035,248, issued May 15, 1962. The conventional block diagrams shown in FIG. 1 and FIG. 2 are partial illustration of the single station system as shown in this copending application. To provide convenient cross reference with this prior application, identical reference characters and designations have been used wherever possible in order to facilitate easy comparison. It is to be understood, however, that the circuits disclosed in this present application may also be used and will operate with multi-station systems of similar type such as shown, for example, in the copending application for Letters Patent of the United States Serial No. 815,647, filed May 26, 1959 by J. P. Coley et al. for Remote Control Systems, now Patent No. 3,122,723, issued February 25, 1964. Furthermore, the principles of operation and even the circuit arrangements of the present invention are applicable to other types of electronic remote control systems, either of the continuously scanning type or of the cyclic type in which all of the remote stations are scanned during each separately initiated cycle of operation by counting chains driven by sequential stepping pulses transmitted from a single control location.

In practicing our invention, we provide a control circuit of an electronic flywheel type at each remote station in the remote control system. This control circuit is interposed between the counting chain and the receiver unit by which the master stepping pulses, generated and transmitted from the control office, are received at the particular station. The flywheel control circuit is also interposed ahead of the stepping pulse circuitry which supplies, from a single series of pulses formerly received from the office, two sets of sequential stepping pulses in which the pulses of the second set alternate in time-space relation with the pulses of the first set. This is a specific arrangement used in the system illustrated in Patent 3,035,248 which requires two series of alternately occurring stepping pulses to drive the stages of the counting chain. The control circuit at each location includes a detection stage which responds to the master stepping pulse input from the pulse receiver to provide a signal output whose character is indicative of the condition or nature, that is, the timing and/or wave form, of the received pulses. In other words, the output signal from the control circuit detection stage has a distinctive character in accordance with whether the received stepping pulses are properly received or are interrupted or mutilated in transmission. This signal output normally controls the operation of a self-oscillating circuit arrangement which is shown as being in the form of a free running multivibrator means in each embodiment of our invention. This self-oscillating circuitry acts as an auxiliary stepping pulse generator and supplies its output pulses to the stepping pulse circuitry. The series of output pulses from the multivibrator arrangement are of the same frequency of occurrence as the master stepping pulses received from the control location. The stepping pulse circuitry, as previously indicated, converts this single series of stepping pulses into two similar sequences of such pulses, the pulses of the second sequence occurring alternately in time relationship with those of the first sequence. If the master stepping pulses are not received, that is, their transmission is interrupted, or if they are incorrectly received due to spurious pulses induced into the communication channel, the self-oscillating, auxiliary pulse generator circuit arrangement embodying our invention continues to supply its output pulses in sequence at the same frequency of occurrence. This self oscillation action, in synchronism with the stepping at the office, continues for a predetermined interval and thus continues to drive the local chain through its stepping action in general synchronism with the stepping action of the chain at the office location which is driven directly by the master stepping generator.

A control arrangement embodying our invention, due to the coordination between the detection circuit and the oscillating circuit portions, is further designed to restore exact synchronism of the stepping action at the station if the frequency of the self-oscillating portion of the circuit drifts, particularly during periods when the master stepping pulses are interrupted. This restoration action maintains synchronism of the stepping action at the station with that at the control office during the normal operation. In addition, exact synchronism between the stepping actions is restored at the end of a period of interruption of the master stepping pulses during which the flywheel circuit arrangement has solely driven the station chain. This assures that the transmission and reception of the functions in each direction over the communication channel will be at least substantially synchronized during the entire cycle of scanning of station functions.

We shall now describe in more detail the two specific circuit arrangements illustrated, each of which embodies a particular form or arrangement of our invention. We shall then point out the novel features of our invention in the appended claims.

Refer now to FIGS. 1 and 3, in which the first form of a system arrangement embodying our invention is illustrated. As previously mentioned, FIG. 1 is a conventional block diagram illustration of a single station, remote control system of the electronic type, the office location being shown at the left of the drawing and a single field station at the right. These locations are connected by a communication channel illustrated by a conventional single line symbol designated by the reference character LC. Any well known form of communication channel which will transmit several carrier frequency currents may be used for this purpose. This conventional block diagram shows only the blocks representing the units involved in the generating and transmitting of the stepping pulses which are used to drive the counting chains at the two locations. No units are shown for the transmission and reception of the various control and indication functions which also will be transmitted over the communication channel during the operation of the system. These function transmission elements are not involved in the arrangement embodying our invention and are thus omitted in order to simplify the arrangement shown.

As in the basic system disclosed in the reference Patent No. 3,035,248, the office is provided with a master stepping generator. Any well known arrangement may be used which will provide a consecutive series of output pulses at a preselected stepping frequency rate. At the office, these pulses are supplied through a stepping pulse circuit designated by the conventional block SPC to the counting chain over stepping lines SL1 and SL2. The pulse circuit SPC may be similar to that shown in FIG. 4 of Patent 3,035,248. Unit SPC provides alternate pulses over lines SL1 and SL2, each set or series of pulses over a single stepping line being at the frequency of the master stepping pulses generated by the master stepping generator. These alternate pulses may either be pulses having a negative potential or may be represented by the removal of a positive potential from the stepping line. The counting chains are assumed to be of the general type shown in Patent 3,035,248, which chains require two stepping lines alternately supplied with stepping pulses. However, other systems may require different arrangements and such arrangements are included in the scope and coverage of our invention. For example, the counting chains shown in the copending application for Letters Patent of the United States Serial No. 800,775, filed March 20, 1959, by E. I. White for Remote Control Systems, now Patent No. 3,021,508, issued February 13, 1962, will require a slightly different stepping arrangement for which the circuits of our invention may be adapted.

The master stepping generator at the office also transmits its stepping pulses over the communication channel to the various stations. These are transmitted as pulses of carrier current having a frequency here designated as frequency *f*5 in order to correspond with that shown in the previously mentioned Grose and Hurst patent. Transmitter and filter units, tuned to this frequency *f*5 and of any well known, commonly used type, are provided to receive stepping pulses from the master stepping generator and to retransmit them as carrier current pulses over the communication channel. These carrier current pulses are received from the channel at the station location shown in FIG. 1, through a filter *f*5, by a receiver *f*5, each tuned to this frequency. These units may be of any conventional, well known design that will cooperate with the corresponding transmitter at the office location. Receiver output over line X is in the form of negative potential, direct current pulses at the same frequency rate as those generated by the master stepping generator at the office.

The pulses supplied over line X are fed into the flywheel circuit designated as unit 3, details of which are shown in FIG. 3, and the operation of which will be discussed in connection with that circuit diagram. Output pulses from unit 3 are fed over line Z into the stepping pulse circuit FSPC. This later unit is the same type as the corresponding office unit SPC and is shown in detail in Patent 3,035,248. The pulse output from unit FSPC is fed into the station counting chain over stepping lines FSL1 and FSL2 to drive that chain in the manner described in the aforementioned reference. The output pulses from unit FSPC occurring in line FSL2 in the form of negative potential, direct current pulses and alternating between the primary stepping pulses in line FSL1, are also fed back into unit 3 over branch connecting line Y to aid in the driving and operation of this flywheel circuit arrangement. A specific use of these feedback pulses will appear in the detailed description to follow shortly.

We shall refer now to FIG. 3 for the detailed circuits of unit 3 shown in FIG. 1. As shown, the flywheel arrangement is of transistorized electronic circuitry using PNP junction type transistors which are designated by conventional symbols. It is to be noted that the circuits of FIG. 4, which will be discussed hereinafter, are also of transistorized form using similar type transistors. It is obvious, of course, that NPN junction type transistors may also be used, if desired, and the potential connections modified in accordance with the requirements of this latter type transistor. No specific source of operating potential for the transistors is shown in the circuits of FIG. 3 as the use of such sources of operating energy is conventional and well known in the art. Any one of several well known types of direct current energy sources may be used with these circuits. For purposes of specific reference, a positive, a negative, and a ground potential bus designated respectively by the reference characters LB, LN, and LE are illustrated in the drawing and will be referred to from time to time. Reference to these bus connections is equivalent to a reference to the positive, the negative, and an intermediate, grounded terminal of the direct current energy source, the actual potetnials being of such values as will enable proper operation of the transistors used. It is to be noted that similar potential bus connections are used in the detailed circuits of FIG. 4 and equivalent meaning is intended by references to the buses therein.

Referring to FIG. 3, transistors Q1 and Q2 are connected in a manner to form a comparison circuit network. The emitter to collector circuit path of each of these transistors is connected between positive potential bus LB and ground potential bus LE, a limiting resistor being connected between the collector and the ground bus. A cross connection through a resistor is also provided from the collector of each transistor to the base of the opposite transistor of the circuit network. Each transistor base is also connected through an isolation capacitor to a pulse source. For example, the base of transistor Q1 is connected through capacitor C4 to connection X which, as shown in FIG. 1, is the output lead from the *f*5 receiver unit at the station location. The base of transistor Q2 is correspondingly connected through capacitor C5 to line Y which, as shown in FIG. 1, is the feedback branch connection from stepping line FSL2 which is part of the output of the stepping pulse circuitry FSPC at the station location. As will become apparent later, pulses appear alternately on lines X and Y for application to the bases of the transistors. The capacitors inserted in these stepping lines assure that a finite pulse occurs rather than a steady potential. These pulses are of such nature as to cause the corresponding transistor to become conducting. In other words, they are in the nature of a negative going pulse when compared with the normal potential appearing on the base of each transistor. Thus, transistors Q1 and Q2 alternately assume their conducting condition or state, each being in such state for normally half of the time of each master stepping pulse from the office location. Said in another manner, each transistor is conducting approximately half the total time of a stepping or scanning cycle.

Obviously, when either of the transistors is conducting, its collector assumes substantially the full positive potential of bus LB. This positive potential on the collector of transistor Q2 is fed into a rectifying and filter circuit network comprising diode D1, shown as being a half-wave rectifier unit, resistors R1 and R2, and capacitors C1 and C2, one terminal of each capacitor being connected to ground bus LE. These elements form a storage device which supplies an output signal into the signal bus LS. Each time the collector of transistor Q2 assumes a positive potential, capacitors C1 and C2 are supplied with a charging current. The circuit for this charging current may be traced from positive bus LB through the emitter-collector circuit path of transistor Q2, diode D1 in its forward direction, resistor R1 and thence through capacitor C1 to ground bus LE, and also through resistor R2 and capacitor C2 to ground bus LE. Obviously, when transistor Q2 is in its nonconducting state so that its collector assumes substantially the potential of bus LE, there is no charging current flow through the capacitors. However, because of the blocking action of diode D1, the charge existing on the capacitors cannot directly discharge in the reverse direction through this diode and the protection resistors back to bus LE.

The charging action and the storage feature of capacitors C1 and C2 creates a potential on bus connection LS which is in the form of a steady signal of positive potential. The degree of magnitude of this signal is a measure of the timing of the transfer of the conducting state between transistors Q1 and Q2. In other words, through the comparison action of these transistors, the average time over which transistor Q2 is in its conducting state during each period or cycle is represented by the magnitude of the potential signal appearing on bus LS. Obviously, this comparing action of transistors Q1 and Q2 depends upon the reception of the pulses over line X from the *f*5 receiver unit and thus the reception of the master stepping pulses from the office over the communication channel in proper form and timing. However, because of the storage action in capacitors C1 and C2, it is also obvious that no abrupt change in the potential of the signal on bus LS will occur even though the reception of the stepping pulses is interrupted so that transistor Q2 may retain its conducting state over a longer than usual period in the comparison action. However, continued interruption or mutilation of the master stepping pulses as received from the communication channel over a continued period will cause a gradual shift in the potential of the signal on bus LS which will eventually require corrective action within the flywheel circuit network which will be discussed shortly.

Transistors Q3 and Q4 and their associated circuit elements form a free running or astable multivibrator network which acts as an auxiliary stepping pulse generator. The circuit arrangement of this network is generally of conventional nature. For example, the emitter-collector circuit path of each of these transistors is connected between bus LE and negative potential bus LN, a resistor being inserted in each connection between the collector and bus LN. The base of each transistor is cross connected through a capacitor to the collector of the opposite transistor. In addition, each base is connected to the junction point of a resistor voltage-divider network connected between signal bus LS and negative potential bus LN. The values of the resistance and capacitance elements of this network are so chosen that the RC time constant involved in the free running multivibrator operation is normally equal to the frequency rate of the stepping pulse output of the master stepping generator at the office location. The timing of the operation of this multivibrator network is also affected by the magnitude of the bias signal appearing on bus LS. The output of the multivibrator, taken from the collector of transistor Q4, is connected through capacitor C3 and diode D2, shown as a half-wave rectifier, to connection Z which, by reference to FIG. 1, is seen to be connected to the stepping pulse circuit FSPC at the station. The terminals of diode D2 are so poled as to permit only the passage of negative potential pulses into connection Z, positive pulses generated in capacitor C3 being shunted to ground bus LE through resistor R3.

It is obvious, in the operation of the multivibrator network, that when transistor Q4 is in its nonconducting state, its collector assumes substantially the negative potential of bus LN. Upon the initiation of this condition, a negative potential pulse is generated in capacitor C3 which is then passed by diode D2 into connection Z. When transistor Q4 becomes conducting so that its collector is substantially at ground potential, the positive going pulse generated in capacitor C3 is, as previously mentioned, shunted to ground bus LE. The supply of negative pulses through conection Z into unit FSPC at the station is similar in manner and scope to the supply of such negative potential pulses direct from receiver unit *f*5 as used in the basic system disclosed in the aforementioned reference Patent 3,035,248. In other words, a supply of negative pulses over connection Z into stepping pulse circuit FSPC causes this unit to generate an output of stepping pulses which are alternately applied, each series at the master pulse frequency rate, over stepping lines FSL1 and FSL2 to the station counting chain. Of course, the pulses appearing in line FSL2 also are fed over branch path Y back into the flywheel circuitry, appearing at connection Y shown at the left of FIG. 3.

We shall now review the operation of the arrangement embodying the first form of our invention as shown in FIG. 1 and FIG. 3. Master stepping pulses are generated at the office location by the master stepping generator unit shown at the left of FIG. 1. These stepping pulses are applied to the office counting chain through the stepping pulse circuit SPC to fulfill the requirement that alternate stepping pulses be provided over stepping lines SL1 and SL2 to the counting chain, each series of pulses having a frequency rate the same as the master pulses. Through the F5 transmitter unit and its corresponding *f*5 filter, the master stepping generator also transmits stepping pulses, in the form of pulses of carrier current of frequency *f*5, over the communication channel to the station location where they are received, through the *f*5 filter, by the *f*5 receiver unit at that location, which cooperates with the transmitter. Negative potential, direct current pulses are supplied by the receiver, as long as it is receiving the carrier current pulses, over line X into the flywheel circuit unit 3.

As shown in FIG. 3, the pulses in connection X are applied to the base of transistor Q1 of the comparison circuit network. These pulses alternate with similar pulses appearing over connection Y and applied to the base of transistor Q2 of the same network. As indicated in FIG. 1, the pulses appearing in connection Y are provided by the stepping pulse circuit unit FSPC at the station. The specific supply is from stepping line FSL2 in which the pulses alternate with those appearing in line FSL1 and thus also alternate with the master stepping pulses in connection X. It is to be noted that the pulses in connection Y will start upon initiation of the system operation. We shall describe shortly the synchronizing by which the correct sequence of pulsing is obtained. However, it is assumed for the present description that pulses are alternately appearing over connections X and Y to be applied to the transistors of the comparison network. The alternating of the conducting condition between transistors Q1 and Q2 causes the charging of capacitors C1 and C2 in the rectifying and storage filter network, this charging action occurring through diode D1 and resistors R1 and R2. The alternate assumption of the conducting state for relatively equal periods by the two transistors maintains the charge on the capacitors, and thus the potential on bus LS, at a preselected level. The RC timing constant of the storage-filter network is selected so that the potential level of the signal on bus LS changes at a very slow rate and thus is representative of the specific timing relationship of the supply of pulses in connections X and Y over a period of time.

The operation of the free running multivibrator formed by transistors Q3 and Q4 is controlled, in part, by the magnitude of the potential of this signal maintained on bus LS, by the charge on capacitors C1 and C2, which is used to provide a positive bias signal applied to the base of each of these transistors. When transistor Q4 becomes nonconducting during the operation of the multivibrator, a negative potential pulse is generated in capacitor C3 and transmitted through diode D2 and over connection Z. Such pulses are applied to unit FSPC which, in turn, develops output pulses transmitted alternately over the stepping lines to the counting chain. The frequency of the operation of the multivibrator is normally the same as the pulses received from the office and applied over connection X to the flywheel circuit network. In other words, when the received stepping pulses from the office and the stepping pulses at terminal Z are exactly in phase, the fixed time delay between the local pulses in line FSL2 and the pulses at terminal Z, and thus between the received stepping pulses and the local pulses, is arranged to produce a steady bias voltage which causes the multivibrator to run at the same frequency as the master stepping pulses received from the office and hence remain in synchronism with them.

In the event that the stepping pulses received from the office become mutilated by interference, as from lightning or other external causes, the absence of the regular signals from the receiver over connection X or the presence of spurious signals will cause little immediate change in the bias voltage applied to the multivibrator since the filter arrangement of capacitor C1, resistor R2 and capacitor C2 is arranged to have a long time constant. Thus, the multivibrator will act as an electronic flywheel and will continue under these circumstances to operate in its free running condition for some time in synchronism with the stepping pulses being generated at the control office. This occurs even though these stepping pulses are not being received at the station or are being received only in such mutilated condition as to be ineffective.

In the event of a long term drift between the received stepping pulses and the local stepping pulses at terminal Z, as may occur during a period of a hundred or more such pulses, the variation in time delay, as detected by the comparison circuit including transistors Q1 and Q2, will cause a corresponding change over this fairly long period in the bias voltage supplied from bus LS to the multivibrator. The multivibrator is made frequency sensitive to changes in this bias voltage so that if it increases due to the stepping pulses received from the office arriving late, that is, the multivibrator running fast and causing the time delay to be increased, the frequency of the multivibrator will be decreased until normal conditions, that is, synchronism, are once again restored. Conversely, if the multivibrator is running slowly so that the received stepping pulses arrive early, the time delay will be decreased and the consequent decrease in bias voltage increases the frequency of the multivibrator until normal conditions are restored. Thus the circuit is self-compensating in the event of a long term drift in the synchronized operation.

Referring now to FIGS. 2 and 4, we shall describe the arrangement embodying the second form of our invention. FIG. 2 is a conventional block diagram showing the stepping circuitry for the remote control system embodying this second form of our invention. The office location at the left of FIG. 2 is identical with that discussed in connection with FIG. 1. This office location has, as before, a master stepping generator and a stepping pulse circuit SPC which supplies stepping pulses alternately over lines SL1 and SL2 to the office counting chain. The master stepping generator also supplies carrier current pulses at the same frequency rate through the $f5$ transmitter and filter units to the communication channel LC. These carrier current pulses are received at the station location shown at the right of FIG. 2 by the $f5$ filter and receiver units resulting in the supply of negative potential output pulses over line connection X to the flywheel circuit unit 4. Stepping pulse circuit FSPC is also similar to that of the first arrangement and supplies stepping pulses alternately over lines FSL1 and FSL2 to the field counting chain. However, the flywheel circuitry of unit 4 differs in specific details from that used in the first system. Only a single input, the master stepping pulse input over connection X from the $f5$ receiver unit, is required. The output over connection Z is supplied to unit FSPC as in the other form. It is to be noted that, since no feedback arrangement is required, this arrangement would be preferably for a remote control system in which only a single stepping line is required for driving the counting chain at a field location.

The flywheel circuits, shown in FIG. 4, include three monostable multivibrator networks designated by reference characters A, B, and C. Each monostable multivibrator includes two transistors, shown as being of the PNP junction type and designated by the reference characters Q5 and Q6, Q7 and Q8, and Q9 and Q10, respectively. The emitter-collector circuit path of each transistor is connected between ground bus LE and negative potential bus LN, a resistor being inserted on the collector side of this connection in the usual manner. The connections to establish monostable multivibrator action are conventional and well-known. In each network, the base of the right hand transistor is connected to the intermediate junction of a resistor voltage-divider network connected between positive and negative potential busses LB and LN. This base is also cross connected through a capacitor to the collector of the left hand transistor. The base of each left hand transistor is cross connected through a resistor to the collector of the right hand transistor. The input circuits to each multivibrator, which will be discussed shortly, are in each case connected to the base of the left hand transistor of the network. Each multivibrator is so circuited that the right hand transistor is normally in its conducting state. In other words, the stable condition for each multivibrator is with this right hand transistor conducting and the left hand transistor in its nonconducting condition. Thus, under normal or stable conditions, the collectors of transistors Q6, Q8, and Q10 are substantially at the ground potential of bus LE. Conversely, the collectors of transistors Q5, Q7, and Q9 in the stable condition have substantially the negative potential of bus LN. The final output for the flywheel circuit is connected to the collector of transistor Q10. Operation is in a manner similar to that used in the circuit arrangement of FIG. 3 so that the same reference characters are used for the elements of this output network. In other words, when transistor Q10 shifts to its nonconducting state, a negative potential pulse is developed in capacitor C3 as a result of a negative potential suddenly appearing on the collector of this transistor. This negative potential pulse is transmitted through diode D2 into connection Z from which it is supplied to stepping pulse circuit FSPC where alternate stepping pulses are generated to drive the counting chain at this location. Positive potential pulses developed when transistor Q10 shifts to its conducting state are shunted from capacitor C3 to ground potential bus LE, being blocked from transmission into connection Z by diode D2 which is poled to block such positive potential.

The sections B and C of this circuitry are interconnected to effectively form a single, free running multivibrator element, which acts as the auxiliary stepping pulse generator in this form. In other words, interconnections are such that when monostable multivibrator B relaxes, that is, returns to its normal or stable condition, it triggers multivibrator C into its non-stable condition. Conversely, when section C returns to its stable condition, it causes a triggering action which shifts multivibrator B into its non-stable state. Tracing the operation in more detail, when section B returns to its stable state so that transistor Q7 shifts to its non-conducting condition, the negative potential appearing at the collector of transistor Q7 is transformed into a negative potential pulse by capacitor C6 and transmitted through diode D6 to the base of transistor Q9 in section C. This application of a negative potential to the base of transistor Q9 causes this transistor to become conducting, shifting the condition of section C to its non-stable state and causing transistor Q10 to become nonconducting. It is to be noted that resistor R6 is connected between the junction terminal of capacitor C6 and diode D6 to shunt positive potential pulses to ground bus LE. Depending upon the RC time constant provided for section C, this monostable multivibrator returns to its normal or stable condition at the end of a preset time interval subsequent to the application of the negative potential pulse from section B. When this relaxation action occurs, the negative potential then appearing at the collector of transistor Q9 causes a negative potential pulse to be generated in capacitor C7 which is passed through diode D7 to the base of transistor Q7 of section B of the circuitry. Again, a resistor R7 is connected between ground bus LE and the junction terminal between the capacitor and diode to shunt the positive potential pulses which are generated when a shift to the non-stable condition occurs. A second trigger circuit for section B is connected between the base of transistor Q7 and the collector of transistor Q5 of section A. This trigger circuit includes capacitor C8 and diode D8 with resistor R8 connected to shunt the positive potential pulses to ground bus LE. Thus, when multivibrator A returns to its stable condition and negative potential again appears on the collector of transistor Q5, a negative potential pulse is applied through this last traced trigger circuit to the base of transistor Q7 of multivibrator B.

Multivibrator A is normally driven by negative potential pulses received over connection X from the $f5$ receiver unit, as further received over communication channel LC from the office location. These pulses are applied to the base of transistor Q5. It may be at times desirable to insert an isolating capacitor in connection X in the same manner as capacitor C4 shown in FIG. 3. However, this arrangement is not here shown, but such modification is covered by this description. The time constant provided for section A is so adjusted that this multivibrator unit normally relaxes, that is, returns to its stable condition at the same time as section C. This occurs at a preset time interval after the application of the negative potential pulse over connection X which causes transistor Q5 to become conducting and transistor Q6 to shift to its nonconducting condition, this being the non-stable state of the multivibrator unit. Multivibrator B thus normally receives simultaneous negative potential pulses from sections A and C, these being generated in capacitiors C8 and C7, respectively, and applied to the base of transistor Q7. The time constant for the restoration of multivibrator B from its non-stable to its stable condition, in which transistor Q8 once again is in its conducting state, is adjusted so that the operation of the combination of sections B and C as interconnected is in synchronism wih the received stepping pulses and thus the operation of multivibrator A. Each time section B returns to its normal or stable condition, a negative potential pulse is developed in capacitor C6 which causes section C to shift to its non-stable condition. As previously explained, this causes the generation of a negative potential pulse in capacitor C3 which is transmitted through diode D2 to connection Z and thence, in proper form, is applied to the counting chain. The over-all timing of the flywheel circuit arrangement, in particular the various monostable multivibrator sections thereof, is such that the negative potential pulse in Z occurs in synchronism with the received master stepping pulses which are applied over connection X to section A.

We shall now describe the operation of the circuit arrangement shown in FIG. 4. Normally, the stepping pulses are received over connection X in a regular, consecutive sequence having the same frequency rate as the master stepping pulses generated at the office location. Each pulse is applied to the base of transistor Q5, which shifts to its conducting condition. After a preset time interval, established by the RC time constant of section A, this multivibrator section returns or relaxes to its stable condition so that transistor Q6 becomes conducting and transistor Q5 non-conducting. A negative potential pulse then developed in capacitor C8 is applied through diode D8 to the base of transistor Q7 in section B. This latter transistor shifts to its conducting state, reversing multivibrator B to its non-stable condition. As previously explained, a similar negative potential pulse is applied at the same time to the base of transistor Q7 from section C through capacitor C7 and diode D7. After another present time interval, established by the RC time constant of section B, this multivibrator relaxes so that transistor Q8 once again shifts to its conducting condition, transistor Q7 returning to its normal nonconducting state. A negative potential pulse is developed at this time in capacitor C6 and applied through diode C6 to the base of transistor Q9 in multivibrator C.

This negative potential pulse affects a shift to the conducting state by transistor Q9 so that transistor Q10, of necessity, becomes nonconducting and its collector assumes the negative potential of bus LN. This causes a negative potential pulse to be developed in capacitor C3 which is transmitted through diode D2 to connection Z and thus serves to effect stepping of the counting chain. This negative potential pulse in connection Z occurs simultaneously with the next master stepping pulse received over the communication channel and applied by connection X to the base of transistor Q5. After a preset time interval, multivibrator C relaxes, restoring Q10 to its conducting condition and Q9 to its nonconducting state. A negative potential pulse is thus developed in capacitor C7 and applied through diode D7 to the base of transistor Q7 in section B. Section A relaxes at the same time so that its negative potential pulse, as previously explained, is also applied to the base of transistor Q7. In normal operation, the two negative potential pulses are simultaneously applied to the base of transistor Q7 in multivibrator B of the circuit network. Operation continues in this normal, cyclic manner as long as no fault occurs to interrupt the reception of the stepping pulses from the office location.

If the master stepping pulses are received slightly sooner than usual, multivibrator A is triggered as previously explained, but slightly prior to its usual time. After the normal fixed time delay, this multivibrator relaxes to its stable condition, triggering section B in the usual manner, but prematurely to the expected time. In this way, the cycle of operation of the combination of multivibrators B and C is advanced in time sequence. The pulse into section B from multivibrator C, when this latter section relaxes to its stable condition, occurs after B has been otherwise triggered and thus is ineffective.

If the master stepping pulse is received a little later in time sequence than normal, section A is triggered as previously described but later in sequence. The output pulse produced when section A relaxes to its stable state expectedly would be ineffective in triggering multivibrator B since section C will already have provided a triggering pulse to section B at the usual time, and thus in advance of the section A pulse under these circumstances. However, a clamp in the form of diode D4 is connected between the collector of transistor Q5 in section A and the base of transistor Q7 in section B. Diode D4 is so poled as to suppress the negative potential triggering pulse provided from section C, when it relaxes, through capacitor C7 into section B. Multivibrator B is thus forced to wait until section A relaxes to its stable condition at a slightly later time, making ineffective the clamping circuit through diode D4 and providing the usual negative potential pulse through capacitor C8 and diode D8 to the base of transistor Q7. The shift of multivibrator B to its non-stable condition is thus delayed until section A has relaxed and the cycle of operation of the combination of multivibrators B and C is retarded in time sequence. Thus the circuit arrangement is self-compensating in the event of a long term drift in the synchronized operation.

In the event that the master stepping pulse transmitted from the office is mutilated or eliminated by interference from an external fault or cause, the absence of the usual triggering signal to the base of transistor Q5 will result in multivibrator A remaining dormant in its stable condition. Under this condition, the combination of multivibrators B and C continues to run substantially in synchronism with the stepping pulses at the control office so that the field counting chain advances its stepping action substantially in synchronism with the office chain. If spurious pulses having a nature similar to that of the master stepping pulses are introduced into the communication channel, it would at first thought appear that multivibrator A will be spuriously triggered and interfere with the operation of the over-all circuit. However, a clamp in the form of diode D5 is connected between the collector of transistor Q7 in section B and the base of transistor Q5 in section A, specifically, to the conection X from receiver unit *f*5. Diode D5 is so poled as to make ineffective the input signal pulses over connection X if multivibrator B is in its unstable condition so that multivibrator A is normally nonresponsive to input signals occurring other than during an allowed time interval, that is, the correct time plus or minus some small tolerance. Said in another way, the spurious input signals occurring in connection X too early in the time sequence are suppressed by this diode clamp D5 from section B, the collector of transistor Q7 having a ground potential at this time. Spurious signals occurring too late in the time sequence will find that multivibrator B has already been triggered either as a result of a signal received during the allowed interval or by the normal action of section C. Thus, the combination of multivibrators B and C acts as a flywheel circuit and continues to run in synchronism with the stepping pulses being generated at the control office, even in the presence of completely spurious signals induced into the communication channel or in the absence of normal signals.

It is to be noted that the circuits disclosed in FIGS. 3 and 4 and described above may be, if desired, employed also at the control office at which the master stepping generator is located. Even though no carrier link is involved between the master stepping generating and the adjacent stepping pulse circuit SPC, the use of such flywheel circuits at the office location will safeguard against momentary stalling or incorrect operation of the master stepping generator. Such use of the flywheel circuit arrangements of our invention will not normally be made, however.

From the preceding discussion, it is to be seen that the circuits embodying the two forms of our invention provide for continued stepping operation at the field locations of a remote control system of a cyclic scanning type in which the driving or master stepping pulses are generated at a single location and transmitted over a communication chanel to all remote stations. A continued operation of the station counting chains, under fault conditions occurring in the transmission of the master stepping pulses, allows the system to remain substantially in synchronism for an extended time interval so that the conrtol and indication functions transmitted in each direction between the office and the station may be correctly received by the proper apparatus. A loss of synchronism in system operation is thus avoided and the recording of incorrect or improper control and indication functions is eliminated. The circuit arrangement embodying our invention thus provides for improved operation of such remote control systems, particularly in territories where spurious pulses are frequently induced in the communication channels due to external causes such as lightning and other natural phenomena.

Although we have herein shown and described but two forms of electronic drive circuits for remote control systems embodying our invention, various modifications and changes may be made in these circuits within the scope of the appended claims without departing from the spirit and scope of our invention.

Having thus described our invention, what we claim is:

1. In combination with a cyclic scanning remote control system including an office and at least one remote station connected by a communication channel, said system including a master stepping generator means having connections to said channel for transmitting a successive series of stepping pulses for driving all locations through the scanning cycle and a receiver means at said station with connections to said channel and responsive to said stepping pulses to provide a local pulse output, (a) a detection means controlled by said receiver means and responsive to the pulse output thereof for maintaining a signal output of a character determined by the received stepping pulses, (b) an auxiliary stepping generator means controlled in part by said detection means and responsive to said signal output for generating a series of successive pulses in synchronism with said stepping pulses, (c) said auxiliary stepping generator means being self-oscillating for continuing the generation of said successive pulses substantially in synchronism with said stepping pulses during any distortion of the proper reception of said stepping pulses, (d) output means controlled by said auxiliary stepping generator means for supplying said successive pulses to drive the station apparatus.

2. In a cyclical scanning remote control system including an office and at least one remote station connected by a communication channel, each location having apparatus adapted to respond to successive stepping pulses supplied thereto for transmitting and receiving functions pertaining to said remote control system, the combination comprising, (a) a master stepping generator means having connections to said channel for transmitting series of master stepping pulses, (b) means at said office having connections for receiving said master stepping pulses and for converting them to drive the associated apparatus, (c) a receiver means at said station having connections to said channel and responsive to the reception of said master stepping pulses for supplying an output of successive pulses, (d) a detection means controlled by said receiver means and responisve to the successive pulse output thereof for maintaining a signal output of a character determined by the received master stepping pulses, (e) an auxiliary stepping generator means controlled by said detection means and responsive to said signal output for generating a series of station stepping pulses in synchronism with said master pulses, (f) said auxiliary stepping generator means being self-oscillatory in the event of an interruption of said successive pulses for continuing the generation of said station stepping pulses substantially in synchronism with said master stepping pulses, (g) pulse output means controlled by said auxiliary stepping generator means for applying the station stepping pulses to drive the station apparatus in synchronism with the corresponding office apparatus.

3. In a cyclic scanning remote control system including an office and a plurality of stations connected by a communication channel, each location having apparatus adapted to respond to successive stepping pulses supplied thereto for transmitting and receiving functions pertaining to said remote control system, the combination comprising, (a) a master stepping generator at said office for generating a series of successive master stepping pulses and having connections to said channel for transmitting such pulses to said stations, (b) means at said office responsive to said master stepping pulses for driving the associated apparatus through a scanning cycle, (c) detection means at each station having connections to said channel for receiving said master stepping pulses, (1) said detection means being responsive to said master stepping pulses for supplying an output signal having character determined by the condition of the received pulses, (d) an auxiliary stepping generator means at each station controlled by the associated detection means and normally responsive to the output signal for generating successive station stepping pulses in synchronism with said master stepping pulses, (1) each auxiliary stepping generator means having connections for supplying station stepping pulses to the associated station apparatus to drive that apparatus in synchronism with the corresponding office apparatus, (e) each auxiliary stepping generator means being self-oscillating in the event of interruption or distortion of the output signal from the associated detection means for continuing to generate the successive station stepping pulses substantially in synchronism with the master stepping pulses.

4. In combination with a cyclic scanning remote control system including an office and at least one remote station connected by a communication channel, said system including a master stepping generator means having connections to said channel for transmitting a successive series of stepping pulses for driving all locations through the scanning cycle and a receiver means at said station with connections to said channel and responsive to said stepping pulses to provide a local pulse output, (a) a detection means controlled by said receiver means and responsive to the pulse output thereof for maintaining a signal output having a character in accord with the condition of the received stepping pulses, (b) an auxiliary stepping generator means controlled in part by said detection means and responsive to said signal output for generating a series of successive pulses in synchronism with said stepping pulses, (c) said auxiliary stepping generator means being self-excited during a temporary absence of said signal output for continuing the generation of said successive pulses substantially in synchronism with said stepping pulses, (d) output means controlled by said auxiliary stepping generator means for supplying said successive pulses to drive the station apparatus.

5. In a cyclical scanning remote control system including an office and at least one remote station connected by a communication channel, each location having apparatus adapted to respond to successive stepping pulses supplied thereto for transmitting and receiving functions pertaining to said remote control system, the combination comprising, (a) a master stepping generator means having connections to said channel for transmitting successive master stepping pulses, (b) means at said office having connections for receiving said master stepping pulses and for converting them to drive the associated apparatus, (c) a receiver means at said station having connections to said channel and responsive to the reception of said master stepping pulses for supplying an output of successive pulses, (d) a detection means controlled by said receiver means and responsive to the successive pulse output thereof for maintaining a signal output having a character established by the condition of the received master stepping pulses, (e) an auxiliary stepping generator means controlled at times by said detection means and responsive to said signal output for generating a series of station stepping pulses in synchronism with said master stepping pulses, (f) said auxiliary stepping generator means being self-oscillatory in the event of a distortion of said signal output for continuing the generation of said station stepping pulses substantially in synchronism with said master stepping pulses, (g) pulse output means controlled by said auxiliary stepping generator means for applying the station stepping pulses to drive the station apparatus in synchronism with the corresponding office apparatus.

6. In a cyclic scanning remote control system including an office and at least one remote station connected by a communication channel, each location having apparatus adapted to respond to successive stepping pulses supplied thereto for transmitting and receiving functions pertaining to said remote control system, the combination comprising, (a) a master stepping generator at said office for generating a series of successive master stepping pulses and having connections to said channel for transmitting such pulses to said station, (b) means at said office controlled by said generator and responsive to said master stepping pulses for driving the associated apparatus through a scanning cycle, (c) detection means at said station having connections to said channel for receiving said master stepping pulses, (1) said detection means being responsive to said master stepping pulses for supplying a periodic output signal having a characteristic value determined by the condition of the received master stepping pulses, (d) storage means at said station controlled by said detection means and responsive to said periodic output signals for storing a signal representative of the average characteristic value of a series of successive output signals, (e) multivibrator means having connections to said storage means and responsive to said stored signal for generating successive station stepping pulses in synchronism with said master stepping pulses, (1) said multivibrator means having other connections for supplying stepping pulses to the station apparatus to drive that apparatus in synchronism with the corresponding office apparatus, (f) said storage means holding a stored signal in event of interruption or distortion of said periodic output signal to maintain the operation of said multivibrator means to generate station stepping pulses substantially in synchronism with said master stepping pulses.

7. In a remote control system in which all remote locations are consecutively scanned during each cycle of operation and which includes a control office and at least one remote station connected by a communication channel, each location having apparatus responsive to the application of successive stepping pulses supplied thereto for operating through a scanning cycle to transmit and receive functions pertaining to said remote control system, the combination comprising, (a) a master stepping generator means having connections to said channel for transmitting successive stepping pulses, (b) means at said office having connections for receiving said stepping pulses and for driving the associated apparatus through a scanning cycle, (c) a receiver means at said station having connections to said channel and responsive to said master stepping pulses for supplying an output of successive pulses, (d) a multivibrator means at said station for generating station stepping pulses and having connections for supplying such pulses to drive the associated apparatus through a scanning cycle, (e) a detection means at said station controlled by said receiver means and responsive to the successive pulse output thereof for maintaining a signal output which characterizes the condition of the stepping pulses received over said channel, (f) said detection means having connections to the corresponding multivibrator means for holding that multivibrator in synchronism with the master generator output when correctly received over said channel, (1) said multivibrator continuing to operate substantially in synchronism with said master stepping generator means for a preselected period when the reception of master stepping pulses is interrupted.

8. In a remote control system in which all remote locations are consecutively scanned during each cycle of operation and which includes a control office and a plurality of remote stations connected by a communication channel, each location having apparatus responsive to the application of successive stepping pulses supplied thereto for operating through a complete scanning cycle to transmit and receive functions pertaining to said remote control system, the combination comprising, (a) a master stepping generator having connections to said channel for transmitting a series of successive master stepping pulses to all locations in said system, (b) means at said office having connections for receiving said master stepping pulses and for driving the associated apparatus through a complete scanning cycle, (c) a receiver means at each station having connections to said channel and responsive to said master stepping pulses for supplying a corresponding output of successive pulses, (d) a multivibrator means at each station for generating successive station stepping pulses and having connections for supplying such pulses to drive the associated apparatus through a complete scanning cycle, (e) a detection means at each station controlled by said receiver means and responsive to the successive pulse output thereof for maintaining a signal output having a character determined by the condition of the master stepping pulses as received over said channel, (f) each detection means having connections to the corresponding multivibrator means for holding that multivibrator output in synchronism with the master stepping pulses when such stepping pulses are received over said channel in proper condition, (1) said corresponding multivibrator continuing to supply station stepping pulses substantially in synchronism with said master stepping pulses when the reception of master stepping pulses at that station is distorted or interrupted.

9. At a station location in a remote control system, the combination comprising, (a) a receiver means having connections for receiving master stepping pulses from a central control office and responsive thereto for supplying a consecutive series of output pulses, (b) a counting chain responsive to consecutive stepping pulses when supplied thereto for stepping through a scanning cycle, (c) a multivibrator means for generating a series of consecutive pulses, (1) said multivibrator having connections for supplying its pulses to drive said counting chain, (d) a detection means controlled by said receiver means for generating an output signal having character in accordance with the condition of the master stepping pulses received, (1) said detection means controlling said multivibrator means in accordance with the character of said output signal for holding the consecutive pulses in synchronism with said master stepping pulses when correctly received, (e) said multivibrator continuing to generate its consecutive pulses substantially in synchronism with said master stepping pulses for a predetermined interval when the reception of said master stepping pulses is distorted.

10. At a station location of a continuously scanning remote control system, said station being connected to the control office by a communication channel, the combination comprising, (a) a receiver means with connections to said channel for receiving stepping pulses transmitted from said office and supplying an output of successive pulses, (b) a pulsing means responsive to an input of successive pulses for generating over separate output leads a first series and a second series of pulses alternating in sequence, (1) said output leads having connections to drive station stepping apparatus through successive scanning cycles, (c) a comparison circuit means separately supplied with input pulses from said receiver means and from the second output lead of said pulsing means and responsive to the alternate inputs for supplying periodic output pulses, (1) each output pulse having a value in accordance with the relative timing of the input pulses to said comparison circuit, (d) a storage means having connections to said comparison circuit means and responsive to the periodic output thereof for converting that output into a continuous signal of average value, (e) multivibrator apparatus controlled by [illegible] means in accordance with the signal for producing an output of successive stepping pulses in synchronism with the received pulses, (1) said multivibrator apparatus having connections to said pulsing means for supplying said successive pulses thereto, (f) said storage means in event of the interruption of the reception of stepping pulses from said office holding said continuous signal at substantially its last averaged value for a predetermined interval to maintain operation of said multivibrator substantially in synchronism with the interrupted pulses.

11. In a cyclic scanning remote control system including an office and a plurality of stations connected by a communication channel, each location having apparatus adapted to respond to successive stepping pulses supplied thereto for transmitting and receiving functions pertaining to said remote control system, the combination comprising, (a) a master stepping generator at said office for generating a series of successive master stepping pulses and having connections to said channel for transmitting such pulses to said stations, (b) means at said office responsive to said master stepping pulses for driving the associated apparatus through a scanning cycle, (c) a control means at each station in the form of an astable multivibrator with connections for supplying successive station stepping pulses to drive the associated station apparatus, (d) a pulse detection circuit means at each station connected to said channel and to said control means and responsive to said master stepping pulses for normally driving said control means to supply said station stepping pulses in synchronism with said master stepping pulses, (e) said control means at each station being self-controlled as an astable multivibrator for continuing to supply said station stepping pulses substantially in synchronism with the master stepping pulses generated at the office in the event such master stepping pulses are received at that station in a distorted condition or are interrupted.

References Cited in the file of this patent

UNITED STATES PATENTS

| | | |
|---|---|---|
| 2,229,089 | Kinsburg | Jan. 21, 1941 |
| 2,442,301 | Locke | May 25, 1948 |
| 2,802,199 | Albrighton et al. | Aug. 6, 1957 |
| 2,806,944 | Sheffield et al. | Sept. 17, 1957 |
| 2,936,442 | Christman et al. | May 10, 1960 |
| 2,992,363 | Granquist | July 11, 1961 |

UNITED STATES PATENT OFFICE

CERTIFICATE OF CORRECTION

Patent No. 3,138,781 June 23, 1964

Stanley Leonard Hurst et al.

It is hereby certified that error appears in the above numbered patent requiring correction and that the said Letters Patent should read as corrected below.

Column 18, line 3, strike out "stepping" and insert the same before "pulses" in line 4, same column 18.

Signed and sealed this 20th day of October 1964.

(SEAL)
Attest:

ERNEST W. SWIDER
Attesting Officer

EDWARD J. BRENNER
Commissioner of Patents